United States Patent [19]
Gerth

[11] Patent Number: 6,062,608
[45] Date of Patent: May 16, 2000

[54] COAXIAL FLUE-SYSTEM FOR DIRECT-VENT FIREPLACES

[75] Inventor: Fred B. Gerth, La Mirada, Calif.

[73] Assignee: Marco Manufacturing, Inc., Lynwood, Calif.

[21] Appl. No.: 09/124,813

[22] Filed: Jul. 29, 1998

[51] Int. Cl.[7] ............................... F16L 39/00; F23J 13/04
[52] U.S. Cl. ............. 285/123.15; 285/424; 285/123.16; 454/47
[58] Field of Search ..................... 454/44, 47; 285/424, 285/123.15, 123.16, FOR 113, FOR 120; 138/113

[56] References Cited

U.S. PATENT DOCUMENTS

| | | | |
|---|---|---|---|
| 806,544 | 12/1905 | Kinne | 285/424 |
| 962,298 | 6/1910 | Babbitt | 285/424 |
| 1,185,400 | 5/1916 | Hefner | 285/424 |
| 1,440,273 | 12/1922 | Carman | 284/424 |
| 1,661,674 | 3/1928 | Osborn | 285/424 |
| 1,769,322 | 7/1930 | Truax | 285/123.16 |
| 1,992,312 | 2/1935 | Kuehn | 285/424 |
| 2,679,867 | 6/1954 | Epstein | 285/424 |
| 2,707,493 | 5/1955 | Bonvillian et al. | 138/113 |
| 2,756,778 | 7/1956 | Curtis | 285/424 |
| 2,894,537 | 7/1959 | Carr | 285/424 |
| 2,914,090 | 11/1959 | Isenberg | 138/113 |
| 2,959,196 | 11/1960 | Truesdell et al. | 285/424 |
| 2,978,261 | 4/1961 | Epstein | 285/123.16 |
| 3,872,780 | 3/1975 | Zanias | 285/123.16 |
| 4,060,068 | 11/1977 | Lever et al. . | |
| 4,082,322 | 4/1978 | Lever . | |
| 4,502,370 | 3/1985 | Baileys et al. | 98/60 |
| 4,607,665 | 8/1986 | Williams . | |
| 4,951,714 | 8/1990 | Detzel et al. . | |
| 5,016,609 | 5/1991 | Shimek et al. . | |
| 5,076,254 | 12/1991 | Shimek et al. . | |
| 5,218,953 | 6/1993 | Shimek et al. . | |
| 5,267,552 | 12/1993 | Squires et al. . | |
| 5,392,760 | 2/1995 | Binzer . | |
| 5,468,026 | 11/1995 | Annestedt . | |
| 5,471,973 | 12/1995 | Wilhoite . | |
| 5,479,916 | 1/1996 | Shimek et al. . | |
| 5,509,696 | 4/1996 | Smith et al. . | |
| 5,562,088 | 10/1996 | Valters et al. . | |
| 5,590,641 | 1/1997 | Duong . | |
| 5,603,312 | 2/1997 | Champion et al. . | |
| 5,647,340 | 7/1997 | Shimek et al. . | |
| 5,669,374 | 9/1997 | Valters et al. . | |
| 5,715,808 | 2/1998 | Wilhoite . | |
| 5,782,231 | 7/1998 | Wade . | |

*Primary Examiner*—Eric K. Nicholson
*Attorney, Agent, or Firm*—Blakely Sokoloff Taylor & Zafman

[57] ABSTRACT

A coaxial pipe assembly for a direct vent fireplace coaxial flue-system. The coaxial pipe assembly has an inner flue pipe residing within an outer flue pipe where the two pipes are retained to one another. Each flue pipe has a male connector and a female connector with the male connector of the outer flue pipe being aligned with the female end of the inner flue pipe. Lances are formed into the female connector of the outer flue pipe and a locking ridge is formed into the male connector of the outer flue pipe. Each of the two flue pipes of a first coaxial pipe assembly is designed to engage their counterpart in an adjacent coaxial pipe assembly. This engagement seals the adjacent inner flue pipes and is fixed upon the locking ridge passing the lances of a first coaxial pipe assembly to snap into place.

12 Claims, 4 Drawing Sheets

COAXIAL FLUE-SYSTEM FOR DIRECT-VENT FIREPLACES

BACKGROUND OF THE INVENTION

1. Field of the Invention

This invention relates to coaxial flue piping systems for factory built, direct vented, gas burning fireplaces or stoves having a sealed combustion chamber that vents either through a wall or a roof. In particular, this invention relates to coaxial pipe assemblies that lend themselves to a quick, easy, and clean method of connection to form a complete, coaxial flue piping systems.

2. Background Information

Fireplaces which open into a room are commonly found in homes to provide a highlight in aesthetic value and/or meet the need for space heating. These conventional fireplaces take the air needed for combustion from the hot or cold air in the interior living environment of the house. Other home appliances such as running kitchen exhaust fans and toilet exhaust fans draw from this supply of air as well. Normally, this living space air gets replaced by the regular infiltration of outside air through cracks around windows and doors.

In an effort to build more energy efficient houses, the housing industry now builds homes and multi-family units that have essentially become air tight. These air tight homes have led to a reduction in the infiltration of outside air. Under circumstances such as running kitchen exhaust fans and toilet exhaust fans, not enough outside air infiltrates the home to maintain the operations of all the home appliances that utilize air. These various appliances can create a slight negative air pressure in the house which makes it more difficult for a conventional fireplace to work at its optimum level. In some cases, the lack of infiltrated air starves the conventional fireplace for air.

Gas burning fireplaces and stoves also are commonly found in homes to provide a highlight in aesthetic value and/or meet the need for space heating. Unlike conventional fireplaces, direct vent fireplaces do not need to take air from the living environment. Rather, direct vent fireplaces are sealed in the front with fresh air being provided from the outside by a chimney formed from a coaxial pipe system disposed between the direct vent fireplace and a wall or the roof. Because of this significant difference between conventional fireplaces and direct vent fireplaces, there is a shift toward using direct vent fireplaces.

Coaxial flue systems used to replenish fresh air to and exhaust waste gases from conventional fireplaces are known. For example, U.S. Pat. No. 4,607,665 belonging to the assignee of the present invention discloses a mechanical spacer for snapping and holding an inner pipe fixed in place within an encasing outer pipe in a multiple wall pipe assembly. The spacer both functions in place of a bracket in a double wall-chimney pipe assembly and provides several nibs that are used to snap fit one coaxial pipe assembly into an adjacent coaxial pipe assembly. Since the unitary spacer requires no external hardware nor requires welding, screwing, riveting or the like step in the manufacturing or assembly of the pipe assembly, a complete pipe assembly consisting of the inner pipe, outer pipe, and the spacer facilitates the ease in connecting together additional such pipe assemblies to form a complete pipe system.

Art that relates to "fireplace" and "coaxial pipe" includes U.S. Pat. Nos. 5,647,340, 5,479,916, 5,218,953, 4,082,322, and 4,060,068. Patents that reference patent U.S. Pat. No. 4,607,665 belonging to the assignee of the present invention include U.S. Pat. No. 5,509,696 (Connector with spring retainer); U.S. Pat. No. 5,468,026 (Spacer clip for chimney); and U.S. Pat. No. 4,951,714 (Means for vertically supporting a segmented high-temperature internal conduit). Patents that relate to direct vent fireplaces include U.S. Pat. Nos. 5,782,231, 5,715,808, 5,669,374, 5,471,973, and 5,392,760 (Direct vent fireplace); U.S. Pat. No. 5,603,312 (Direct vent wood burning fireplace); U.S. Pat. No. 5,590,641 (Adaptor for installing flue liners to direct vent fireplace inserts); U.S. Pat. No. 5,562,088 (Termination device for horizontal direct vent gas fireplaces or the like); U.S. Pat. No. 5,267,552 (Direct vent gas fireplace); U.S. Pat. Nos. 5,076,254 and 5,016,609 (Direct vented multi glass side fireplace).

To form the chimney of a direct vent fireplace, most coaxial flue system require several coaxial pipe assemblies to form a complete pipe system. Certain installations of direct vent fireplaces require that the direction of the chimney change. This necessitates the installation of elbow coaxial pipe assemblies to form bends in the chimney.

Known coaxial pipe assemblies do not lend themselves to quick, easy, and clean methods of connecting multiple coaxial pipe assemblies to form a complete pipe system. Those assembling multiple coaxial pipe assemblies into a complete pipe system must handle both an inner and outer pipe. This double handling of the pipes is made especially difficult due to the minute amount of piping rotational alignment adjustments necessary to meet unique field conditions. For example, practicing U.S. Pat. No. 4,607,665 requires two people: one to hold the two joining inner flue pipes steady while the other rotates the a first and second outer flue pipe until the nibs of the pipe spacer project past their respective openings and snap into a grove in the second outer flue pipe. Moreover, on aligning one coaxial pipe assembly with an adjacent coaxial pipe assembly, many screws are typically used at each pipe joint to maintain the integrity of each coaxial pipe assembly connection against possible disconnect as required by building codes.

Once the complete pipe system is assembled, the caulking requirements do not lend themselves to a clean installation. For example, caulking is required for the coaxial pipe system of U.S. Pat. No. 4,607,665. As shown in FIG. 7 of U.S. Pat. No. 4,607,665, male end of the inner flue pipe is inserted into the female end from above the female end. As smoke travels upward within the inner flue pipe, the smoke is forced upward into the space between the male end and the female end of U.S. Pat. No. 4,607,665. Since the ball and cup seating design of the male end ridge coming to rest on the female rim cannot be made air tight, the ball and cup seating design is not sufficient for restricting smoke to the interior of the inner pipe. Thus, the inner flue pipe of U.S. Pat. No. 4,607,665 must be caulked to prevent the leakage of smoke from the inner flue pipe.

Thus, there is a need for a coaxial pipe assembly that overcomes these disadvantages relating to known complete pipe systems for fireplaces.

SUMMARY OF THE INVENTION

The invention relates to a coaxial pipe assembly for a direct vent fireplace coaxial flue-system. The coaxial pipe assembly has an inner flue pipe residing within an outer flue pipe where the two pipes are joined together by several brackets. Each flue pipe has a male connector and a female connector with the male connector of the outer flue pipe being aligned with the female end of the inner flue pipe. Lances are formed into the female connector of the outer flue pipe and a locking ridge is formed into the male connector of the outer flue pipe. Each of the two flue pipes of a first coaxial pipe assembly is designed to engage their counterpart in an adjacent coaxial pipe assembly. This engagement is fixed upon the locking ridge of a second coaxial pipe assembly passing the lances of a first coaxial pipe assembly to snap into place.

DETAILED DESCRIPTION OF THE INVENTION

Coaxial pipe assemblies are typically used in direct vent fireplaces to form compete pipe systems that replenish fresh air to and exhaust waste gases from direct vent fireplaces. Conventional coaxial pipe assemblies require double handling during the minute adjustment process, typically require many screws to secure one assembly to another assembly, and require caulking For these reasons, conventional installations are difficult, waste time, and are messy. The invention disclosed relates to coaxial pipe assemblies that lend themselves to quick, easy, and clean methods of connecting multiple coaxial pipe assemblies to form a complete pipe system.

For purposes of explanation, specific embodiments are set forth to provide a thorough understanding of the present invention. However, it will be understood by one skilled in the art, from reading this disclosure, that the invention may be practiced without these details. Moreover, well-known elements, devices, process steps and the like are not set forth in detail in order to avoid obscuring the present invention.

Figure 1:
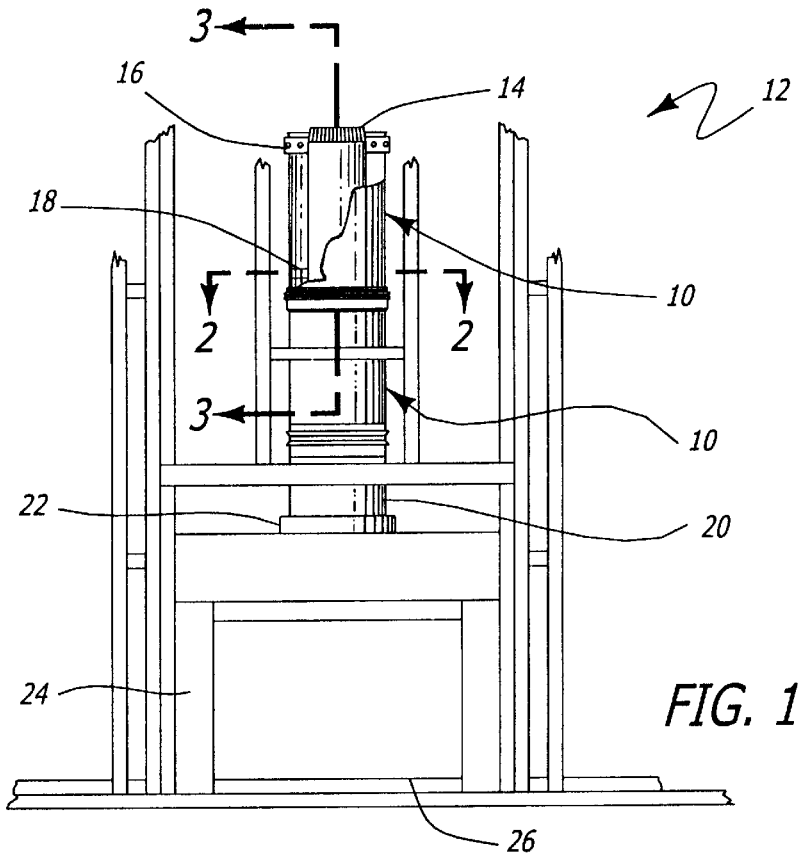
FIG. 1 is an elevation view of a direct vent fireplace having a coaxial flue system.

Reference is now made to FIGS. 1 to 5 to illustrate embodiments of the coaxial pipe assembly. FIG. 1 illustrates a setting in which an embodiment of the present invention is being used. At least one coaxial pipe assembly 10 is needed to form a coaxial flue system 12. As shown in FIG. 1, three coaxial pipe assemblies 10 are engaged to form coaxial flue system 12. First coaxial pipe assembly 10 is shown cutaway to reveal inner flue pipe 14, outer flue pipe 16, and bracket 18. Third coaxial pipe assembly 10 is also referred to as chimney section 20. Chimney section 20 interlocks to exhaust neck 22 of direct vent fireplace 24 having hearth 26. As illustrated, the coaxial flue system 12 for direct vent fireplace 24 is installed into a building or a home. The term fireplace includes stoves as well as other direct vent places where fire burns and which utilize a coaxial flue-system.

Figure 2:
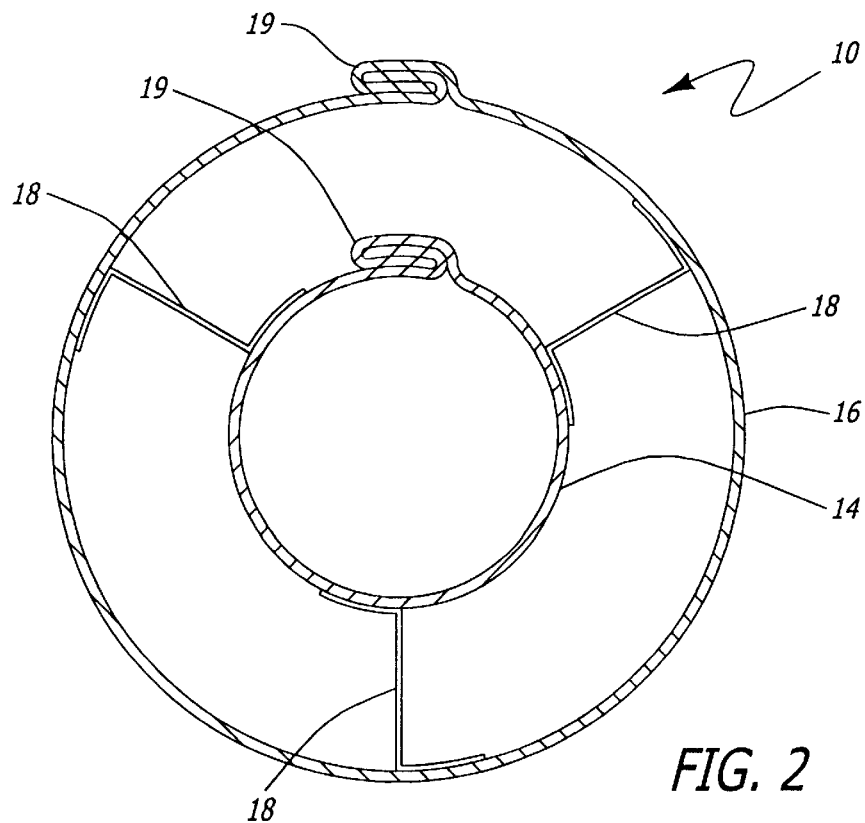
FIG. 2 is a section view of FIG. 1 taken from line 2—2 with details removed for clarity.

FIG. 2 is a section view of FIG. 1 taken from line 2—2 with details removed to show coaxial pipe assembly 10 consisting of inner flue pipe 14, outer flue pipe 16, and three brackets 18. Like outer flue pipe 16, inner flue pipe 14 is formed by cutting a sheet of material such as 28 gauge galvanized steel, punching and/or roll forming features into the sheet, then bending the sheet to connect two opposing edges to form a hollow tube or cylinder. The two opposing edges are interlocked and sealed with an ACME lock seam 19. Other materials and manufacturing processes such those set out in *Mark's Standard Handbook for Mechanical Engineers* (8th ed., 1978) are known and may be accessed to create these hollow tube.

Outer flue pipe 16 is disposed about and connected to inner flue pipe 14. For example, FIG. 1 shows three brackets 18 that are spot-welded to inner flue pipe 14 and subsequently welded to outer flue pipe 16. Each bracket 18 is made out of 20 gauge galvanized steel.

Figure 3:
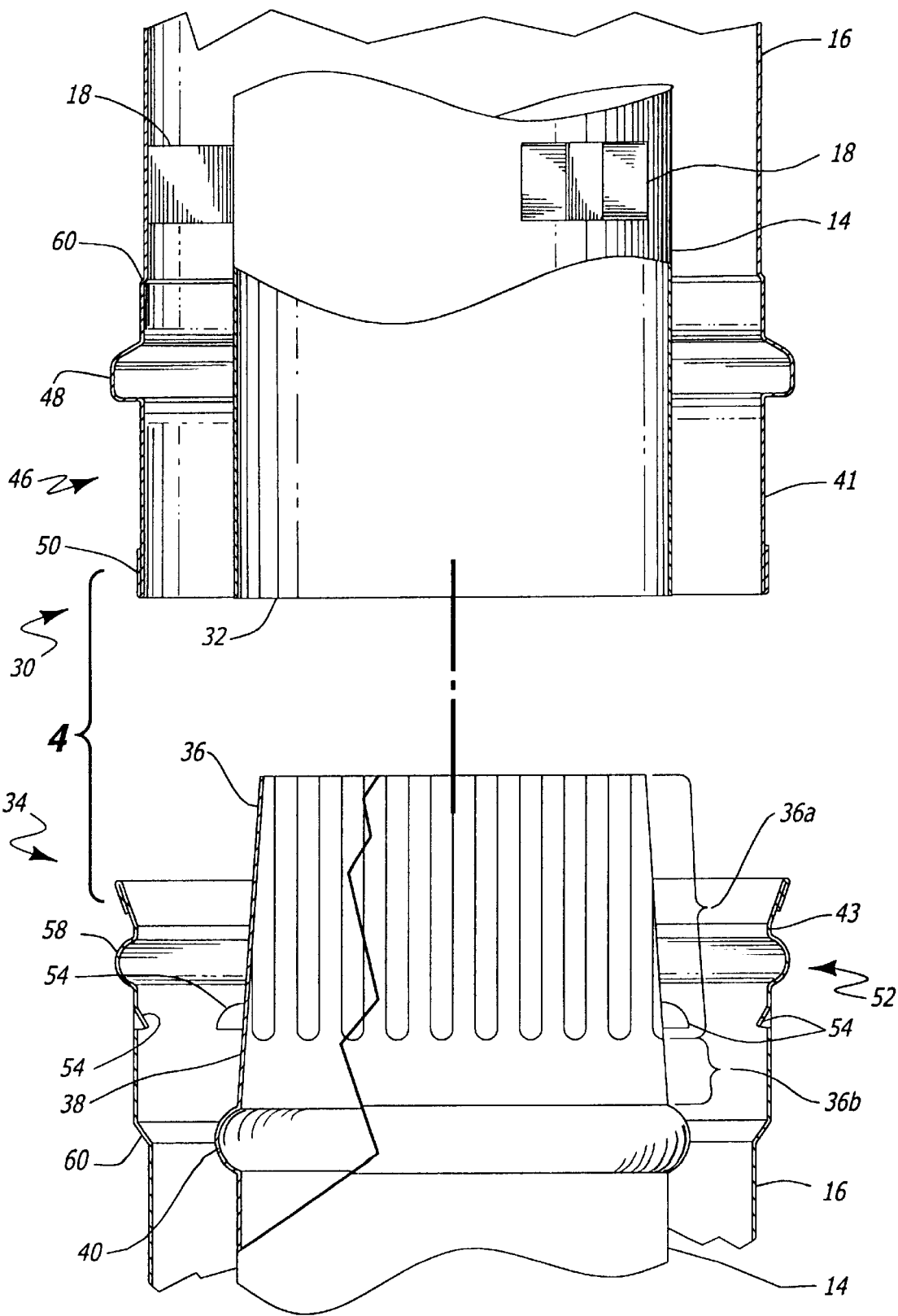
FIG. 3 is an exploded partial section view of FIG. 1 taken from line 3—3 with details removed for clarity.

FIG. 3 is an exploded partial section view of coaxial flue system 12 of FIG. 1 that reveals the details of the male and female connectors of the inner and outer flue pipe. First coaxial pipe assembly 30 shown in FIG. 3 reveals female connector 32 of inner flue pipe 14. Second coaxial pipe assembly 34 reveals male connector 36 of inner flue pipe 14.

Male connector 36 comprises external landing 38 and inner stop bead 40. External landing 38 is an accurately adjusted surface that is inwardly tapered beginning at a point after inner stop bead 40 and terminating at the end of inner flue pipe 14. The taper shape facilitates both the engagement of male connector 36 to female connector 32 as well as seals male connector 36 to female connector 32. In the preferred embodiment, a second region 36*a* of male connector 36 is crimped to further facilitate the ease of assembling male connector 36 into female connector 32 while a first region 36*b* of male connector 36 retains its smooth surface to ensure a good seal between male connector 36 and female connector 32. Each end of inner flue pipe 14 preferably is embossed at the seam to create a tight seal, with male connector 36 embossed to the inside and female connector 32 embossed to the outside.

As a physical back-up stop for the engagement of male connector 36 to female connector 32, male connector 36 of inner flue pipe 14 further comprises inner stop bead 40. Forming a convex projection, inner stop bead 40 extends radially outward from the axis of inner flue pipe 14. As shown in second coaxial pipe assembly 34 of FIG. 3, inner stop 40 is disposed such the external landing 38 resides between inner stop bead 40 and the male end of inner flue pipe 14. To accommodate thermal expansion of female connector 32, inner stop bead 40 is located at a location near the ambient temperature position that female connector 32 seals against external landing 38.

First coaxial pipe assembly 30 shown in FIG. 3 also reveals male connector 41 of outer flue pipe 16. Second coaxial pipe assembly 34 reveals female connector 43 of outer flue pipe 16. The outer flue pipe 16 described below is used by the assignee of the present invention in wood burning fireplaces and thus is prior art for wood burning fireplaces. The outer flue pipe 16 described below has not been used by the assignee of the present invention in gas burning direct vent fireplaces or gas burning direct vent stoves. The outer flue pipe 16 described below is available from Marco Manufacturing, Inc. of Lynwood, Calif.

Male connector 41 comprises first termination end 46 and outer stop bead 48. As shown in FIG. 3, first termination end 46 has locking ridge 50 that preferably is formed by tightly rolling the end of male connector 41 into a hem that extends radially outwards from the axis of outer flue pipe 16 to define an outer diameter that is greater than the outer diameter of outer flue pipe 16. By tightly rolling the end of male connector 41 into a hem, a single, contiguous locking ridge 50 is formed. Locking ridge 50 may also be discontinuous.

To restrict the engagement of male connector 41 to female connector 43 to within a predetermined distance, male connector 41 further comprises outer stop bead 48. Forming a projection, outer stop bead 48 extends radially outward from the axis of the outer flue pipe 16. As shown in first coaxial pipe assembly 30 of FIG. 3, outer stop 48 is disposed in proximity to locking ridge 50.

Female connector 43 comprises second termination end 52 and lances 54. Preferably, second termination end 52 is rolled into a hem and flared out as shown in FIG. 3 to facilitate rapid engagement between male connector 41 and female connector 43. In the preferred embodiment, lances 54 are formed into the material of outer flue pipe 16 so as to form rectangular shapes attached at an angle to outer flue pipe 16 as shown. In the preferred embodiment, eight lances 54 equally spaced about female connector 43 and disposed at equal distances from second termination end 52. By extending radially inward towards the axis of outer flue pipe 16, these lances 54 define an inner diameter that is less than the outer diameter of locking ridge 50.

In the preferred embodiment, female connector 43 further comprises stiffening bead 58 and stiffening jog 60. As shown in second coaxial pipe assembly 34 of FIG. 3, stiffening bead 58 extends radially outward from the axis of outer flue pipe 16 and is disposed in proximity to second termination end 52 such that stiffening bead 58 resides between lances 54 and second termination end 52. Stiffening bead 58 follows second termination end 52 to enhance the integrity of outer flue pipe 16 as it relates to the ANSI Y14.5 roundness. Stiffening jog 60 jogs radially inward from the axis of outer flue pipe 16 and is disposed in proximity to lances 54 such that lances 54 resides between stiffening jog 60 and stiffening bead 58. Stiffening jog 60 serves as an additional stiffener.

After forming inner flue pipe 14 and outer flue pipe 16, inner flue pipe 14 and outer flue pipe 16 are assembled into coaxial pipe assembly 10 as shown in FIG. 2, into first coaxial pipe assembly 30 as shown in FIG. 3, or into second coaxial pipe assembly 34 as also shown in FIG. 3. In the preferred embodiment, this is accomplished with three support brackets 18 located near male connector 41 of outer flue pipe 16. As seen in first coaxial pipe assembly 30 of FIG. 3, inner flue pipe 14 and outer flue pipe 16 are accurately aligned relative to concentricity. Further, male connector 41 of outer flue pipe 16 is aligned flush with female connector 32 of inner flue pipe 14 to resides in the same plane as female connector 32. The relative concentricity between male connector 41 and female connector 32 is fixed by spot-welding bracket 18 to inner flue pipe 14 and outer flue pipe 16 at a location near male connector 41 and female connector 32 as shown in first coaxial pipe assembly 30 of FIG. 3.

Since the second region 36a of male connector 36 of inner flue pipe 14 is tapered and crimped, it is preferable to permit male connector 36 of inner flue pipe 14 to protrude beyond second termination end 52 of outer flue pipe 16. Moreover, engaging the mating ends of adjacent inner flue pipes 14 prior to engaging the mating ends of the adjacent outer flue pipes 16 greatly enhances the speed and ease of assembling the coaxial flue system 12 shown in FIG. 1. Thus, by making the axial length of inner flue pipe 14 greater than the axial length of outer flue pipe 16, inner flue pipe 14 may be aligned to protrude beyond second termination end 52 as shown in second coaxial pipe assembly 34 of FIG. 3. The difference between the axial length of inner flue pipe 14 and the axial length of outer flue pipe 16 defines a leading end. In the preferred embodiment, the leading end has a length of ⅝ inches.

Since the relative concentricity between male connector 41 and female connector 32 is fixed by spot-welding bracket 18 to inner flue pipe 14 and outer flue pipe 16 at a location near male connector 41 and female connector 32 as shown in first coaxial pipe assembly 30 of FIG. 3, female connector 43 of outer flue pipe 16 is adapted to move or float relative to male connector 36 of inner flue pipe 14 by using the fixed retaining point created by the brackets as a pivot point. In other words, the relative concentricity between female connector 43 and male connector 36 is not fixed and thus permits female connector 43 of outer flue pipe 16 to be moved in relation to male connector 36 of inner flue pipe 14 while maintaining female connector 32 of inner flue pipe 14 in a position that is concentric to male connector 41 of outer flue pipe 16. This fluid movement is a tremendous help when connecting coaxial pipe assemblies since outer flue pipes may quickly be aligned and then engaged once inner flue pipes are engaged.

By engaging male connector 36 into the bore of female connector 32 until locking ridge 50 extends past lances 54, first coaxial pipe assembly 30 of FIG. 3 will be assembled and locked into second coaxial pipe assembly 34, thereby locking male connector 36 of inner flue pipe 14 into female connector 32 of inner flue pipe 14 as required by code.

Figure 4:
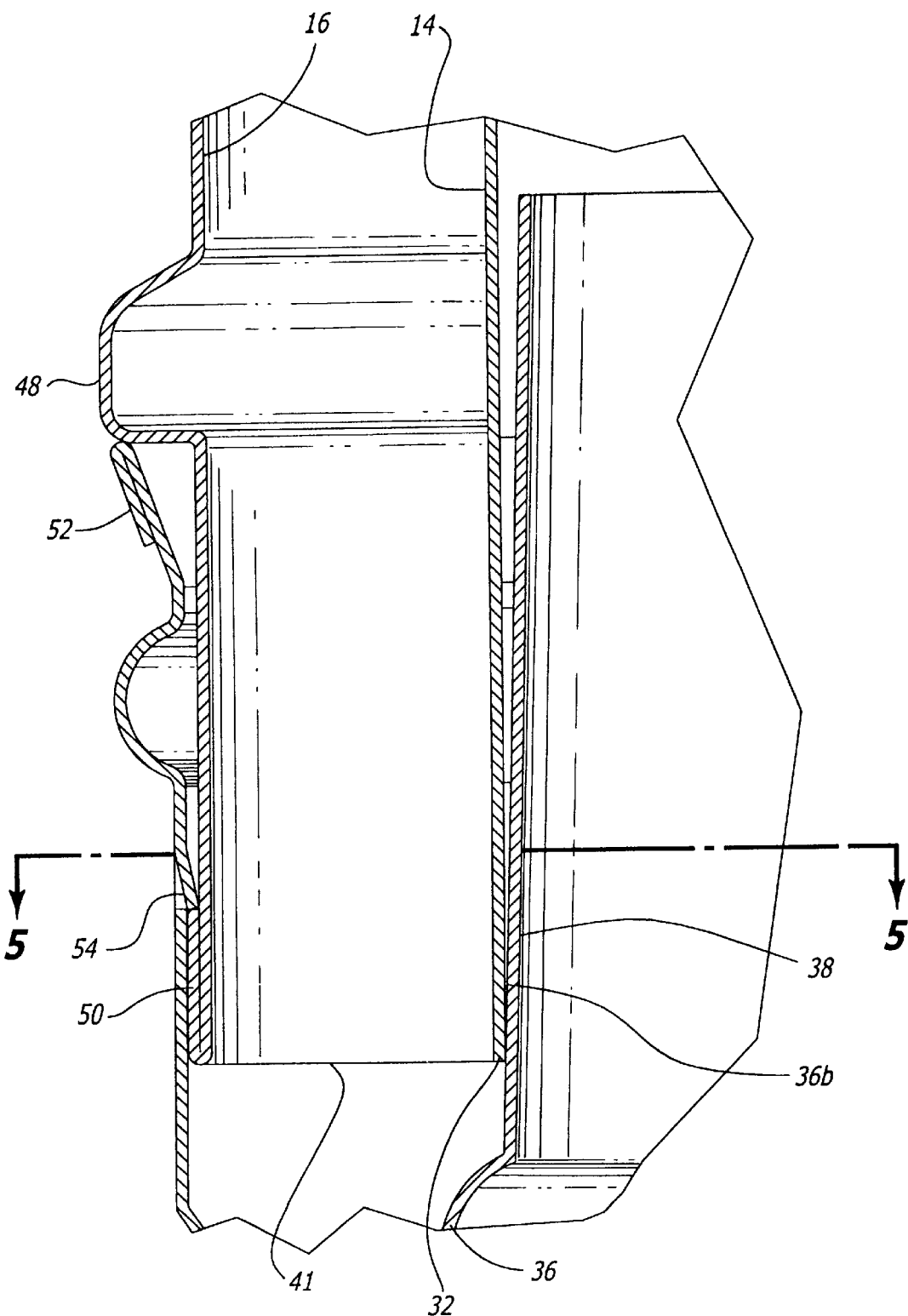
FIG. 4 is a detailed view of the locking mechanism of two adjacent coaxial pipe assemblies.

FIG. 4 is a detailed view of the locking mechanism of two adjacent coaxial pipe assemblies. As shown, locking ridge 50 of male connector 41 is restricted in the upward vertical direction by lances 54 and in the downward vertical direction where second termination end 52 meets up with outer stop bead 48. This restricts the engagement of coaxial pipe assemblies to a predetermined distance. Moreover, female connector 32 forms a tight seal with external landing 38 at first region 36b of male connector 36 as shown, thus eliminating the need for caulking. The relative position between the mating ends of inner flue pipe 14 and the mating ends of outer flue pipe 16 can be seen in the fully engaged and locked position.

Figure 5:
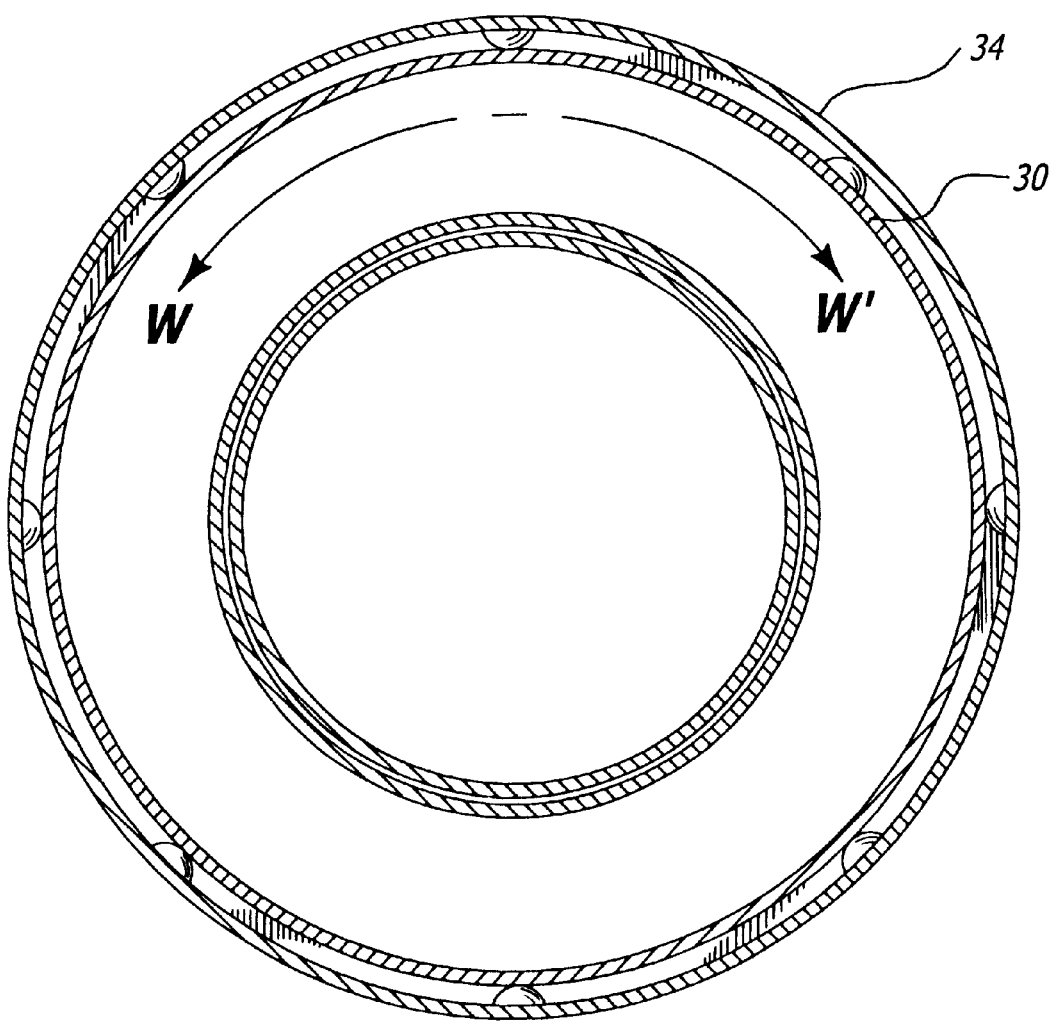
FIG. 5 is a plan section view of FIG. 4 taken from line 5—5 with details reinstated for clarity.

FIG. 5 is a plan section view of FIG. 4 taken from line 5—5 with details reinstated for clarity. Shown in the fully engaged and locked position, the locking mechanism of the present invention permits second coaxial pipe assembly 34 to rotate axially in relationship to first coaxial pipe assembly 30 as shown by arrows W–W'. This relative rotational motion facilitates assembling several coaxial pipe assemblies 10 (of FIG. 1), especially during the installations of direct vent fireplaces that require that the direction of the chimney change through the installation of elbow coaxial pipe assemblies.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. A coaxial pipe assembly for a direct vent fireplace coaxial flue-system, the assembly comprising:
    a first hollow tube defining an outer diameter and defining an axis concentric to the hollow tube, the hollow tube having a first section and a second section, the first section having a male connector defining an outer diameter and the second section having a female connector defining an inner diameter that is greater than the outer diameter of the male connector;
    a second hollow tube disposed about the first hollow tube and defining an outer diameter that is greater than the outer diameter of the first hollow tube and defining an axis concentric to the first hollow tube, the second hollow tube having a first section and a second section, the first section having a male connector and the second section having a female connector, the male connector of the second hollow tube having a first termination end and an outer stop bead, the first termination end having a locking ridge, the locking ridge extending radially outwards from the axis of the second hollow tube to define an outer diameter that is greater than the outer diameter of the second hollow tube, the outer stop bead extending radially outward from the axis of the second hollow tube and disposed in proximity to the locking ridge, the female connector of the second hollow tube having a second termination end and a plurality of lances, the plurality of lances disposed at equal distances from the second termination end and extending radially inward towards the axis of the second hollow tube to define an inner diameter such that the inner diameter defined by the plurality of lances is less than the outer diameter of the locking ridge;

a means for retaining the second hollow tube about the first hollow tube, wherein the female connector of the second hollow tube further comprises a stiffening bead and a stiffening jog, the stiffening bead extending radially outward from the axis of the second hollow tube and disposed in proximity to the second termination end, such that the stiffening bead resides between the plurality of lances and the second termination end, and further wherein the stiffening jog extends radially inward from the axis of the second hollow tube and disposed in proximity to the plurality of lances such that the plurality of lances resides between the stiffening jog and the stiffening bead.

2. The assembly of claim 1, the means for retaining having at least one bracket, the at least one bracket having a first end and a second end, the first end of the at least one bracket coupled to the second hollow tube and the second end of the at least one bracket coupled to the first hollow tube.

3. The assembly of claim 2 wherein the female connector of the first hollow tube terminates in a female end, the at least one bracket having three brackets that retain the second hollow tube to the first hollow tube such that the first termination end of the second hollow tube resides in the same plane as the female end of the first hollow tube.

4. The assembly of claim 3 wherein the three brackets retain the second hollow tube to the first hollow tube such that the female connector of the second hollow tube may be moved in relation to the male connector of the first hollow tube while maintaining the female connector of the first hollow tube in a position that is concentric to the male connector of the second hollow tube.

5. The assembly of claim 4, the first hollow tube further defining an axial length and the second hollow tube further defining an axial length, wherein the axial length of the first hollow tube is greater than the axial length of the second hollow tube.

6. The assembly of claim 5 wherein the difference between the axial length of the first hollow tube and the axial length of the second hollow tube defines a leading end for the male connector of the first hollow tube, the leading end having a length of ⅝ inches.

7. The assembly of claim 1 wherein the male connector of the first hollow tube comprises an external landing and an inner stop bead, the external landing inwardly tapered and terminating at the first end of the first hollow tube, the inner stop bead extending radially outward from the axis of the first hollow tube and disposed such that the external landing resides between the inner stop bead and the first end of the first hollow tube.

8. The assembly of claim 7 wherein the inwardly tapered external landing of the first hollow tube forms a first region and a second region, the second region having a corrugated surface and residing between the first region and the first end of the first hollow tube.

9. The assembly of claim 1 wherein the locking ridge of the first termination end of the second hollow tube is a single, contiguous piece.

10. The assembly of claim 1 wherein the second termination end of the second hollow tube is rolled into a hem and flared out.

11. The assembly of claim 1 wherein the plurality of lances of the second hollow tube are eight lances equally spaced about the female connector of the second hollow tube.

12. The assembly of claim 1 wherein the female connector of the second hollow tube further comprises at least one stiffening bead, the at least one stiffening bead extending radially outward from the axis of the second hollow tube and disposed in proximity to the second termination end, such that the at least one stiffening bead resides between the plurality of lances and the second termination end.

* * * * *